Aug. 17, 1954     A. S. SCHMIDT     2,686,542
GUARD FOR SLICING MACHINE CUTTER DISK SPINDLES
Filed May 29, 1950
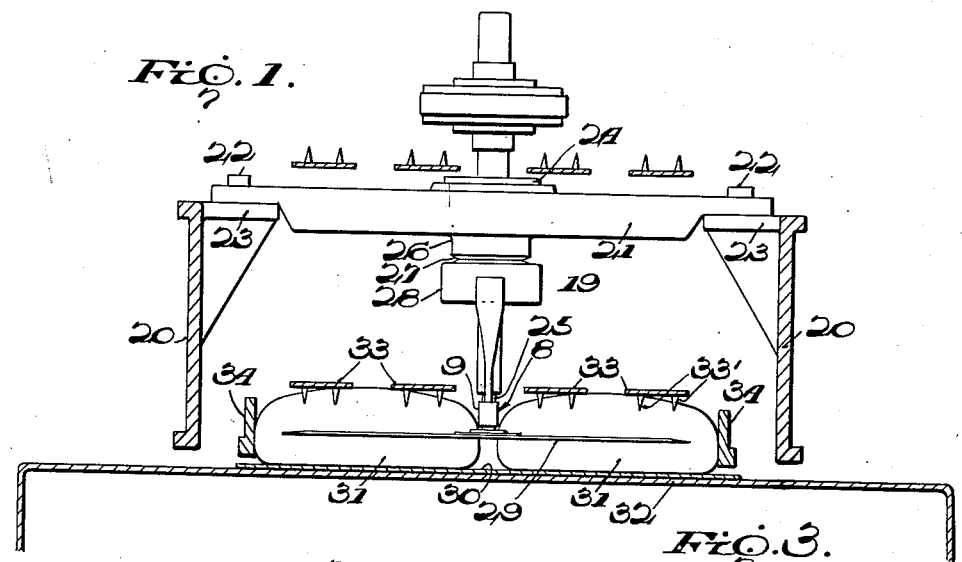
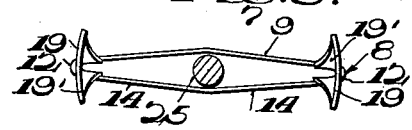
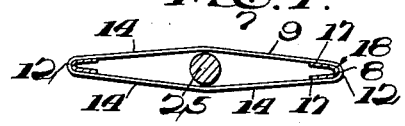
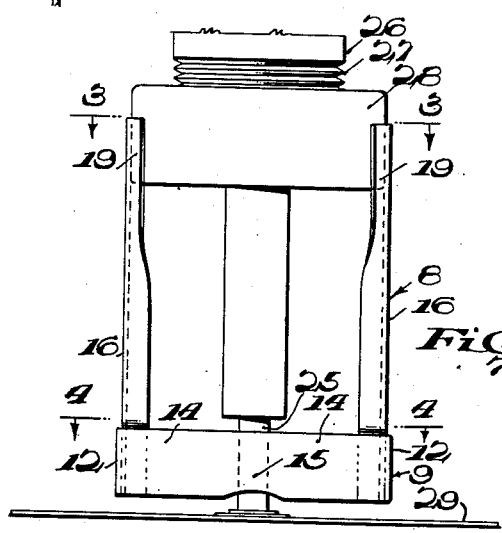
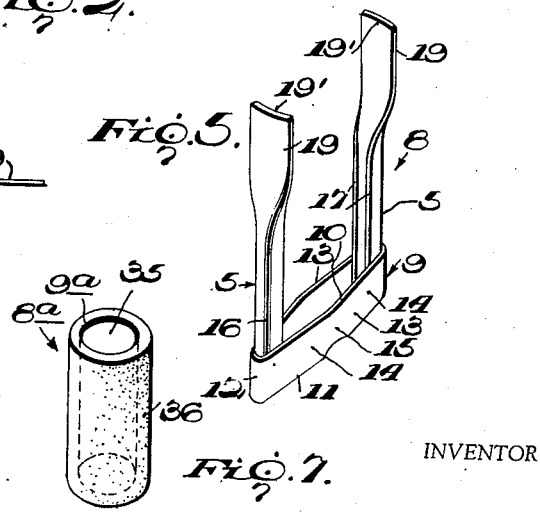
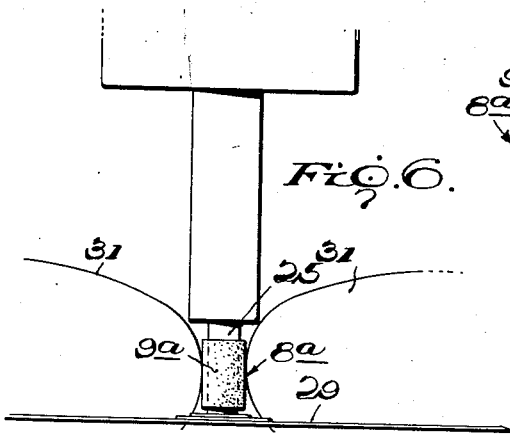
INVENTOR
Albert S. Schmidt
BY Richard L. Underwood
ATTORNEY Patented Aug. 17, 1954

2,686,542

UNITED STATES PATENT OFFICE 2,686,542

GUARD FOR SLICING MACHINE CUTTER DISK SPINDLES

Albert S. Schmidt, Harrisburg, Pa.

Application May 29, 1950, Serial No. 164,947

8 Claims. (Cl. 146—73)

1

This invention relates to guides for guiding resilient or spongy material along sides of the shafts or spindles of rotary cutters or knives and the like, the primary object of the invention being to provide guides of this nature whose action is to obviate contacts between the cutter shafts or spindles and the material which otherwise occur and result in adherence of some of the material to the shafts or spindles with consequent impairment of the material and/or of the cutting operation.

Another important object of the invention is to provide guide means of the character indicated above which are especially suitable for use with the shafts or spindles of the disc cutters of machines of the type disclosed in my copending application Serial No. 64,073, filed December 8, 1948, now Patent #2,669,269, for Slicing Machine, wherein strips or rows of buns or rolls are moved along opposite sides of the shafts or spindles and slit by the disc cutters, for the purpose of eliminating contacts between the relatively slowly moving rows and the relatively rapidly rotating shafts or spindles which otherwise produce adherence of some of the material of the buns or rolls to the shafts or spindles, resulting in tearing out of insides of the buns or rolls or other damage thereto.

A further important object of the invention is to provide guide means of the character indicated above which acts to spread and compress the rows of spongy or resilient material as they are moved along opposite sides of a rotating shaft or spindle so that, as portions of the rows pass along the opposite sides of the shaft or spindle, such portions of the rows are guided away from the related sides of the shaft or spindle so as to be out of contact therewith, and are guided in their resumption of normal position as they pass beyond the shaft or spindle and resume their normally expanded condition due to the natural resilience of the material.

Other important objects and advantageous features of the invention will be apparent from the following description and the accompanying drawings, wherein, merely for purposes of illustration herein, specific forms of the invention are set forth in detail.

In the drawings, wherein like or similar numerals designate like or similar parts throughout the several views:

Fig. 1 is a general, fragmentary transverse vertical section taken through a machine, for slicing rows of hamburger or frankfurter rolls, such as disclosed in my hereinabove cited copending ap-

2 plication, and showing a guide applied to a cutter disc spindle in accordance with the present invention;

Fig. 2 is an enlarged side elevation showing one form of guide associated with a cutter disc spindle;

Figs. 3 and 4 are horizontal sections taken on the lines 3—3 and 4—4, respectively, of Fig. 2;

Fig. 5 is a perspective view of the guide alone;

Fig. 6 is a view similar to Fig. 2 showing another form of guide associated with a cutter disc spindle, and Fig. 7 is a perspective view of the guide alone.

Referring in detail to the drawings, the form of guide shown in Figs. 1 through 5, generally designated 8, comprises a continuous strip or band 9 of sheet metal or other suitable material having parallel upper and lower edges 10 and 11, respectively. The strip or band is bent or formed in a flattened and elongated open diamond shape having curved and convex ends 12 and opposite sides 13 each of which has flat or plane guide portions 14 extending from a point 15, located midway between the ends 12, to the related sides of the ends 12.

Mounting or attaching means for the guide 9 consist of perpendicular arms 5, each comprising a U-shaped cross section standard 16, having the upper part of their side walls 17 and the curved web 18 therebetween spread and flattened to provide transversely and vertically extending grips 19. The lower ends of the standards 16 are positioned within the ends 12 of the guide 9 and secured in position with their side walls 17 and their curved webs 18 conformably engaging the inward surfaces of the ends 12 and adjacent portions of the sides 13 of the guide 9. The grips 19 are resilient and have slightly concaved facing sides 19′.

The above described form of guide 9 is especially suited for association with the type of roll slicing machine referred to hereinabove, pertinent parts of which are shown in Figs. 1 and 2 of the drawings. Such a machine embodies a frame including duplicate laterally spaced walls 20 held in assembled relation by a T bar 21 secured by bolts 22 to portions 23 of the walls. A bearing assembly 24 for the slicing assembly is suitably supported above and between the walls 20, on which the perpendicular spindle 25 is journaled. The bearing assembly 24 consists of a depending cup 26 externally threaded on its lower end, as indicated at 27, the lower end of the cup 26 being provided with an opening (not shown) passing the spindle 25. The cup 26 contains upper and lower bearings (not shown) for the spindle. A packing nut 28, passing the spindle 25, is threaded on the lower end 27 of the cup to retain lubricant in the cup. The lower end of the spindle 25 has axially fixed thereto a flat circular cutter disc 29, the cutter disc 29 being spaced upwardly from a conveyor belt 30 supporting rows of buns or rolls 31 at the proper level to make the desired cuts in the rolls of each row as they are carried by the conveyor belt 30 along opposite sides of the spindle 25. The rows of rolls 31 are in lateral contact as they move toward the slicing assembly, and the spindle 25 passes between the rows and spreads them.

The belt 30 is supported by an underlying bed 32 and other conveyor belts 33 positioned above the rows of rolls and moving with the lower belt 30 have teeth 33' engaging in the tops of the rolls whereby the rows of rolls are prevented from slipping relative to the belts and are positively moved relative to the cutter disc 29 and its spindle 25. Relatively stationary guides 34 engage the outer sides of the rows of rolls and serve not only as means preventing lateral displacement of the rows of rolls by the spindle 25 in their travel toward and away from the slicing assembly, but as means for holding the rolls against lateral displacement while engaged with the spindle 25 and cutter disc 29, and as means insuring the occurrence of the desired laterally inward expansion of the rows, due to their natural resiliency, after the rows pass the slicing assembly, whereby the rows of rolls resume the touching relation which they occupy in approaching the slicing assembly.

The guide 9 is positioned about the lower part of the spindle 25 with its lower edges 11 clearing the cutter disc 29 and extending longitudinally of the rows of rolls 31, with the grips 19 on the upper ends of the standards 16 frictionally engaged with opposite sides of the bearing assembly nut whereby the guide is supported in place. The widest middle part of the guide band 9, at the designated point 15, receives the spindle 25 therethrough. The opposite sides 14 of the band closely approach the opposite sides of the spindle 25 and may be either spaced from the sides of the spindle 25 or have a light bearing thereon. It will be observed that the height or width of the band 9 between its upper and lower edges 10 and 11, respectively, can be less than the height of the portions of the rolls 31 above the cutter disc 29, but the band 9 must have sufficient height to prevent the adjacent side of the rolls from riding over the upper edge of the band 9 and engaging the spindle 25.

In operation, the rows of rolls 31 having been split by a vertical knife (not shown) and being in forward motion produced by the conveyor belts 30 and 33, and the spindle 25 and cutter disc 29 being in operation, the rearward end 12 of the band 9 engages between the rows 31 and the adjacent forwardly diverging surfaces 14 of the band then act to cam the affected portions of the rows 31 apart from each other, and in the process compress the rows between the opposite sides 13 of the band 9 and the guides 34. As the rows 31 pass further along the guide band 9 and in contact with its sides 13, the natural resilience of the rolls causes the rows 31 to expand inwardly toward each other and in so doing to follow the forwardly converging surfaces 14 of the guide band 9, and upon clearing the forward end 12 of the band, the rows reach or resume contact of their facing inner sides with each other. It will be seen from this that at no time during the transit of the rows 31 past the spindle 25 do the rolls come into contact with the spindle 25, so that the slicing of the rows of rolls is accomplished without these undesirable consequences which otherwise inhere in contact of the rolls with the spindle during such transit. The same desirable results are obtainable in the similar slicing of rows of spongy or resilient material other than rolls or similar doughy materials.

Referring now to Figs. 6 and 7 of the drawing, the guide 8a therein shown comprises a vertical plane guide cylinder or collar 9a having an axial polished bore 35 opening through its upper and lower ends loosely and rotatably receiving the lower part of the spindle 25 above the cutter disc 29 whereby the guide cylinder 9a can turn relative to or remain stationary relative to the spindle 25 while the spindle 25 is rotating in a slicing operation. The outside of the guide cylinder 9a has a satin finish, as indicated at 36 so that contact of the facing sides of the rows of material being sliced will stop the cylinder 9a from rotating with the spindle 25. The cylinder 9a being of adequate height compared to that of the material being sliced, the material will be prevented from making contact with the rotating spindle during a slicing operation in the same manner as explained in connection with the form of the invention shown in Figs. 1–5, although the spreading apart of the rows 31 and their resumption of lateral contact with each other is more abrupt in the form of the invention shown in Figs. 6 and 7.

What I claim is:

1. A device for slicing buns or the like comprising a support, a rotatable vertical spindle mounted in said support, a disc cutter mounted in the end portion of said spindle and adapted to rotate in a substantially horizontal plane, and a guide having a smooth surface loosely surrounding said spindle and extending axially along said spindle an appreciable distance from said disc cutter, whereby two buns or the like may be sliced by said cutter and the guide will form a contact for the opposed sides of the buns.

2. A device for slicing buns or the like comprising a support, a rotatable vertical spindle mounted in said support, a disc cutter mounted in the end portion of said spindle and adapted to rotate in a substantially horizontal plane, and a guide having a smooth surface loosely surrounding said spindle and extending axially along said spindle an appreciable distance from said disc cutter, said guide comprising a fixed band tapered in opposite longitudinal directions to provide an approach end in advance of said spindle and a terminal end beyond said spindle, whereby two buns or the like may be sliced by said cutter and the guide will form a contact for the opposed sides of the buns.

3. A device in accordance with claim 2 and including a lower conveyor means supporting said buns or the like and moving them past said disc cutter, and upper hold-down means contacting the tops of said buns or the like and holding them on said lower conveyor means.

4. A device in accordance with claim 2 and including side means pressing said buns or the like inwardly toward each other.

5. A device for slicing buns or the like comprising a support, a rotatable vertical spindle mounted in said support, a disc cutter mounted in the end portion of said spindle and adapted to rotate in a substantially horizontal plane, and a guide having a smooth surface loosely surrounding said spindle and extending axially along said spindle an appreciable distance from said disc cutter, said guide comprising a sleeve loosely mounted on said spindle, whereby two buns or the like may be sliced by said cutter and the guide will form a contact for the opposed sides of the buns.

6. A device in accordance with claim 5 and including a lower conveyor means supporting said buns or the like and moving them past said disc cutter, and upper hold-down means contacting the tops of said buns or the like and holding them on said lower conveyor means.

7. A device in accordance with claim 6 and including side means pressing said buns or the like inwardly toward each other.

8. A device in accordance with claim 7 and wherein the inner wall of said sleeve is polished to minimize friction and the outer wall of said sleeve has a satin finish to insure smooth, sliding engagement with the buns or the like.

References Cited in the file of this patent

UNITED STATES PATENTS

| Number | Name | Date |
|---|---|---|
| 752,264 | Simmons | Feb. 16, 1904 |
| 1,357,611 | Cardone et al. | Nov. 2, 1920 |
| 1,527,262 | Martin | Feb. 24, 1925 |
| 1,879,796 | Ehrlich | Sept. 27, 1932 |
| 1,953,558 | Harrild | Apr. 3, 1934 |
| 2,232,089 | Wool | Feb. 18, 1941 |
| 2,235,745 | Gould | Mar. 18, 1941 |
| 2,260,832 | Deutscher | Oct. 28, 1941 |
| 2,263,869 | Bundschu | Nov. 25, 1941 |
| 2,506,985 | Arnt | May 9, 1950 |
| 2,577,086 | Magnuson | Dec. 4, 1951 |

FOREIGN PATENTS

| Number | Country | Date |
|---|---|---|
| 593,407 | Germany | Feb. 26, 1934 |